W. M. AND P. D. ROBERTS.
APPARATUS FOR MAKING ICE CREAM CONES.
APPLICATION FILED JUNE 24, 1912. RENEWED SEPT. 10, 1919.
1,375,609.
Patented Apr. 19, 1921.
13 SHEETS—SHEET 1.
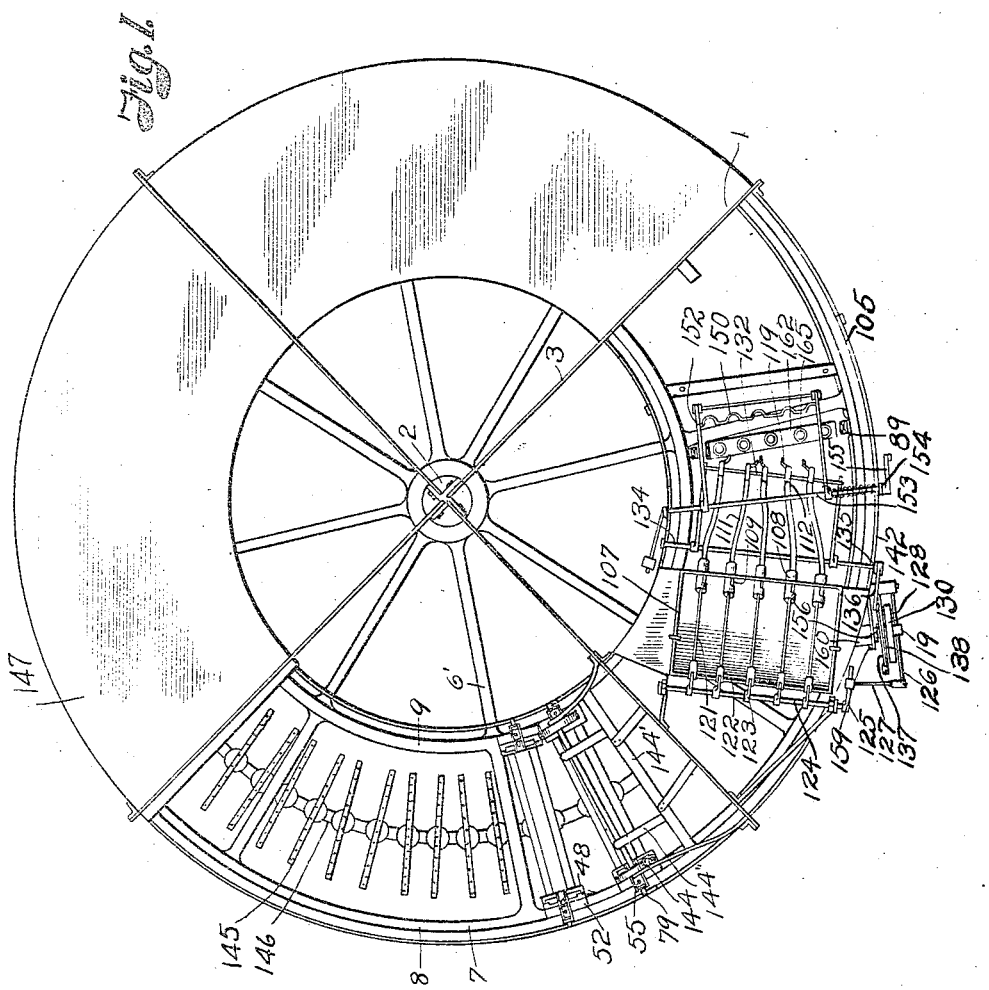
WITNESSES:
Arthur W. Capp.
Lewis L. Miller.
INVENTOR
W. M. Roberts.
P. D. Roberts.
BY
ATTORNEY

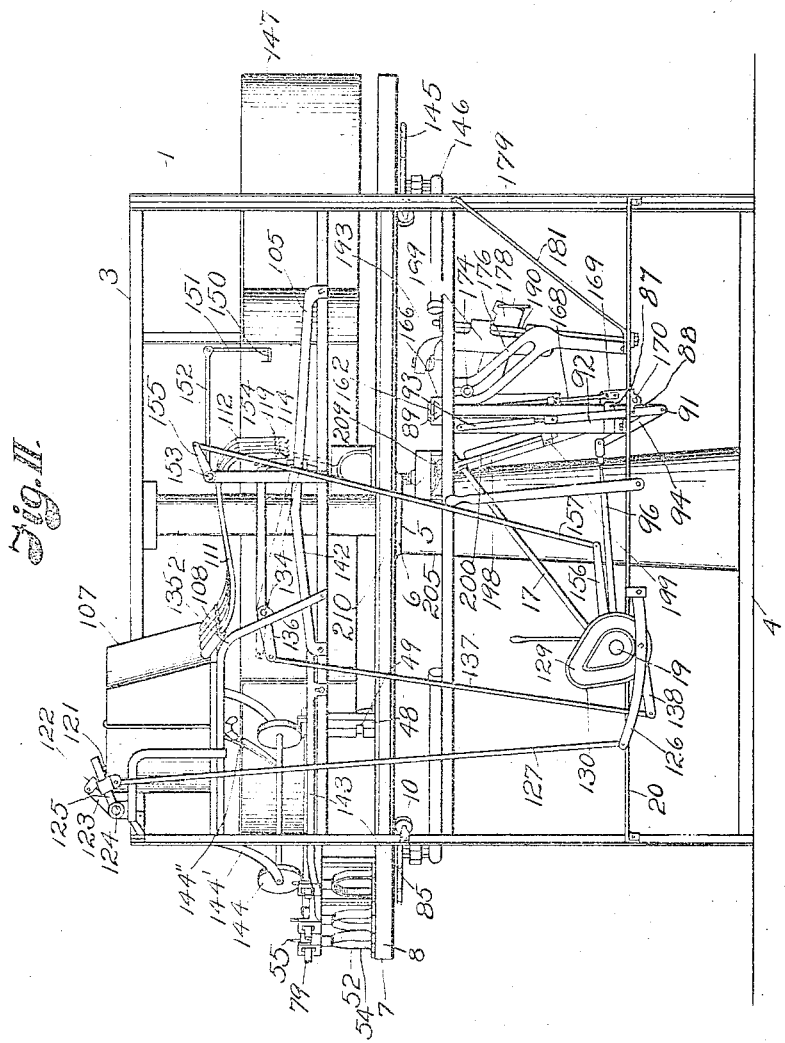

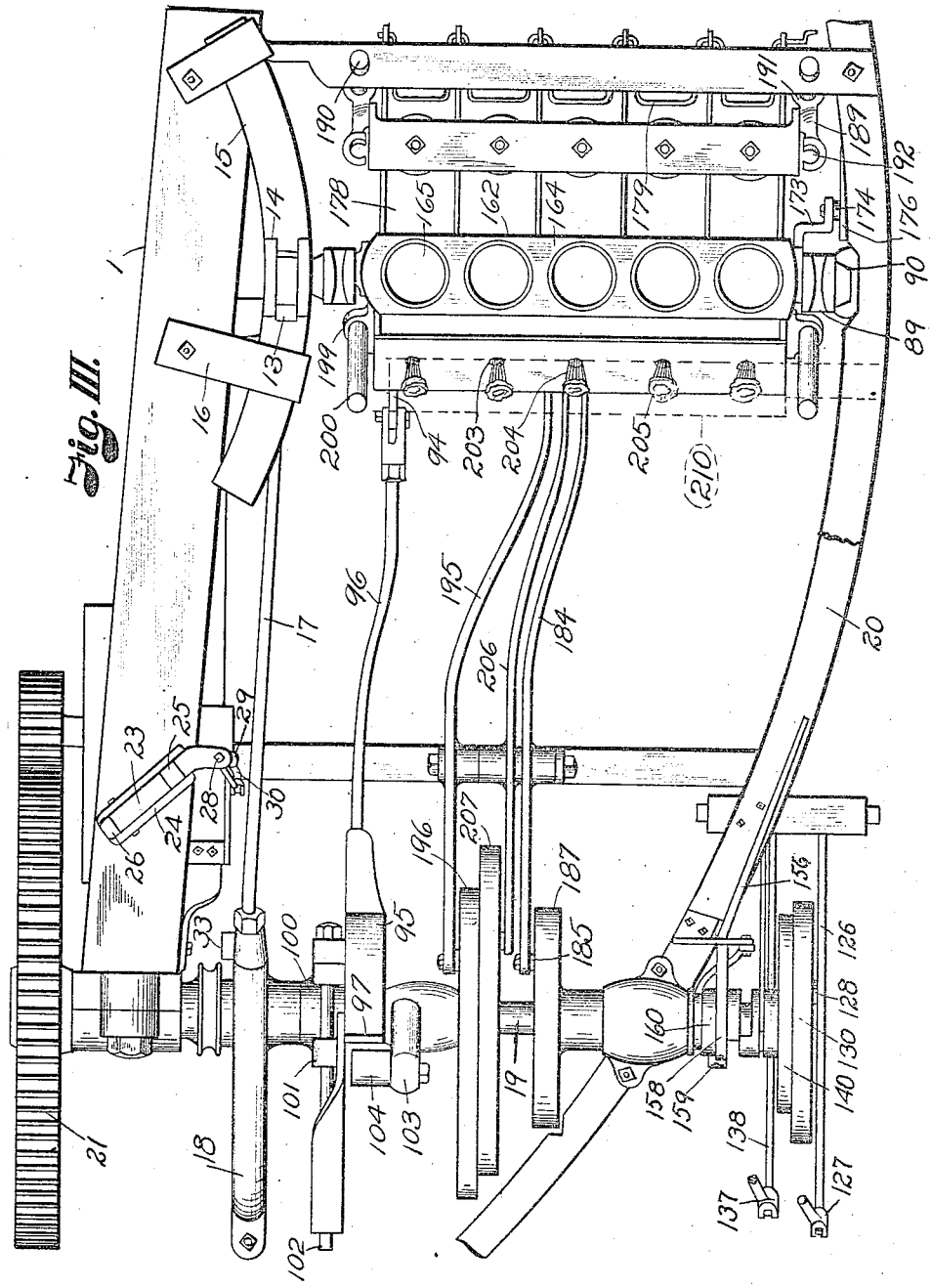

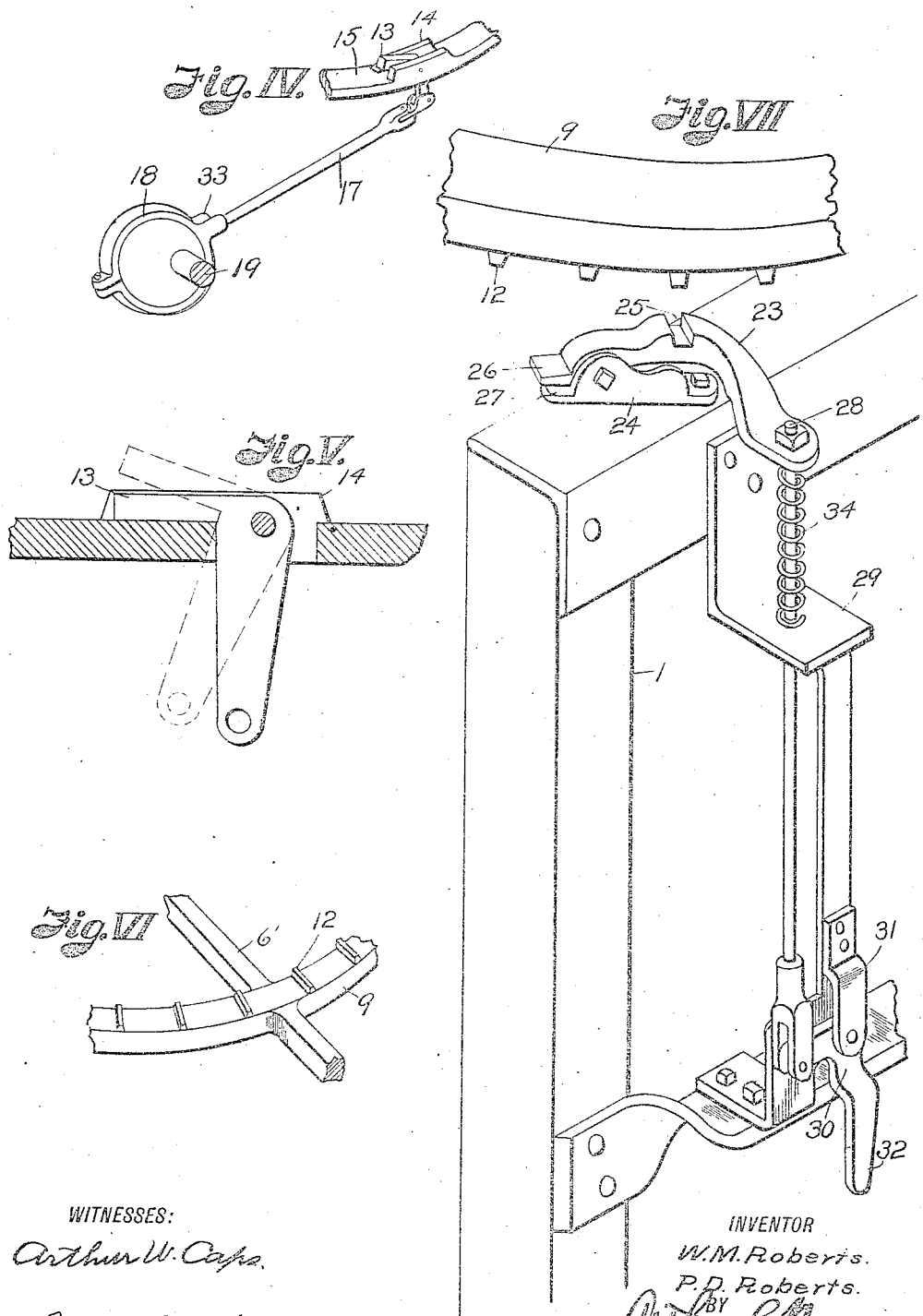

W. M. AND P. D. ROBERTS.
APPARATUS FOR MAKING ICE CREAM CONES.
APPLICATION FILED JUNE 24, 1912. RENEWED SEPT. 10, 1919.
1,375,609.   Patented Apr. 19, 1921.
13 SHEETS—SHEET 5.
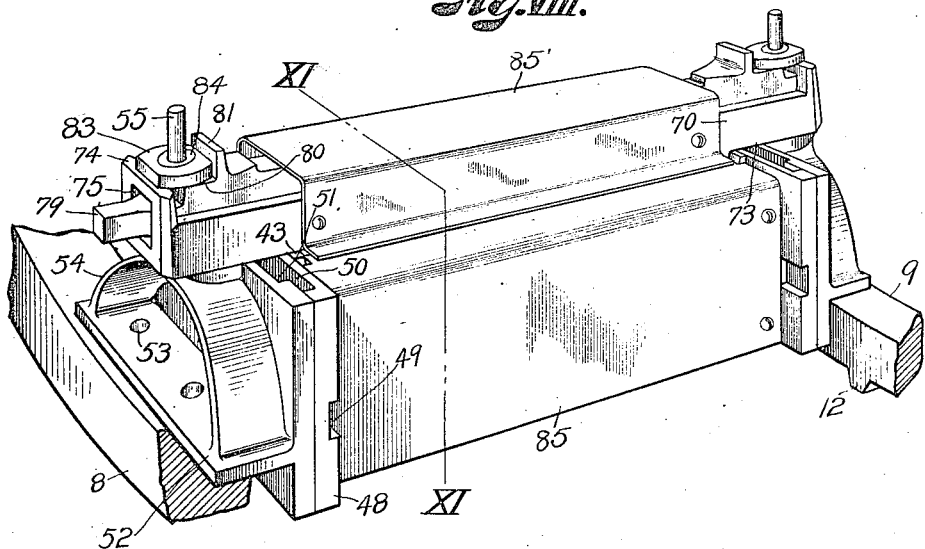
Fig. VIII.
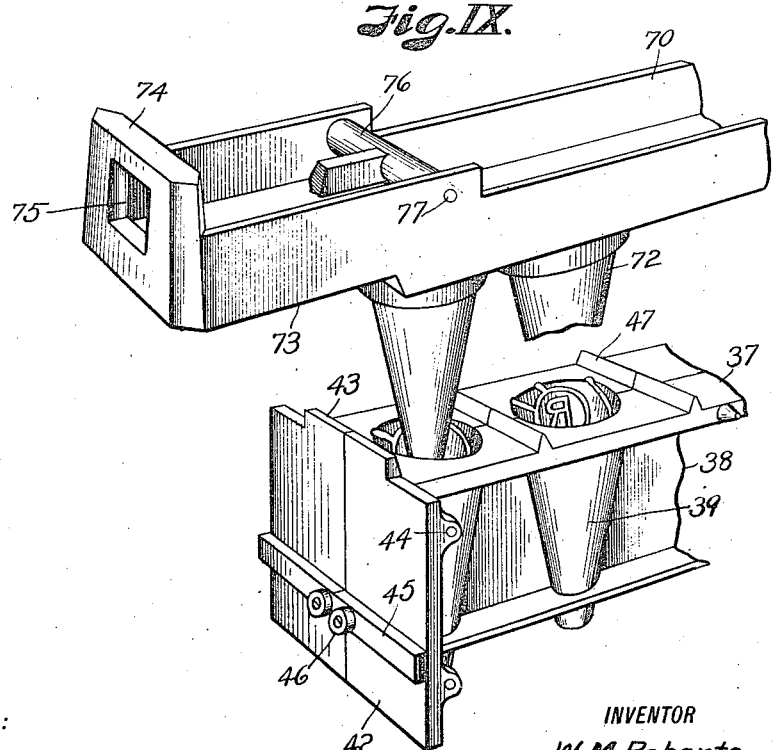
Fig. IX.
WITNESSES:
Arthur W. Cups.
Lewis L. Miller
INVENTOR
W. M. Roberts.
P. D. Roberts.
BY
Arthur C. Brown
ATTORNEY W. M. AND P. D. ROBERTS.
APPARATUS FOR MAKING ICE CREAM CONES.
APPLICATION FILED JUNE 24, 1912. RENEWED SEPT. 10, 1919.
1,375,609.
Patented Apr. 19, 1921.
13 SHEETS—SHEET 6.
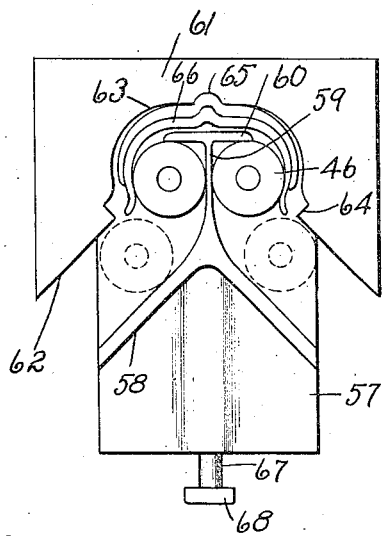
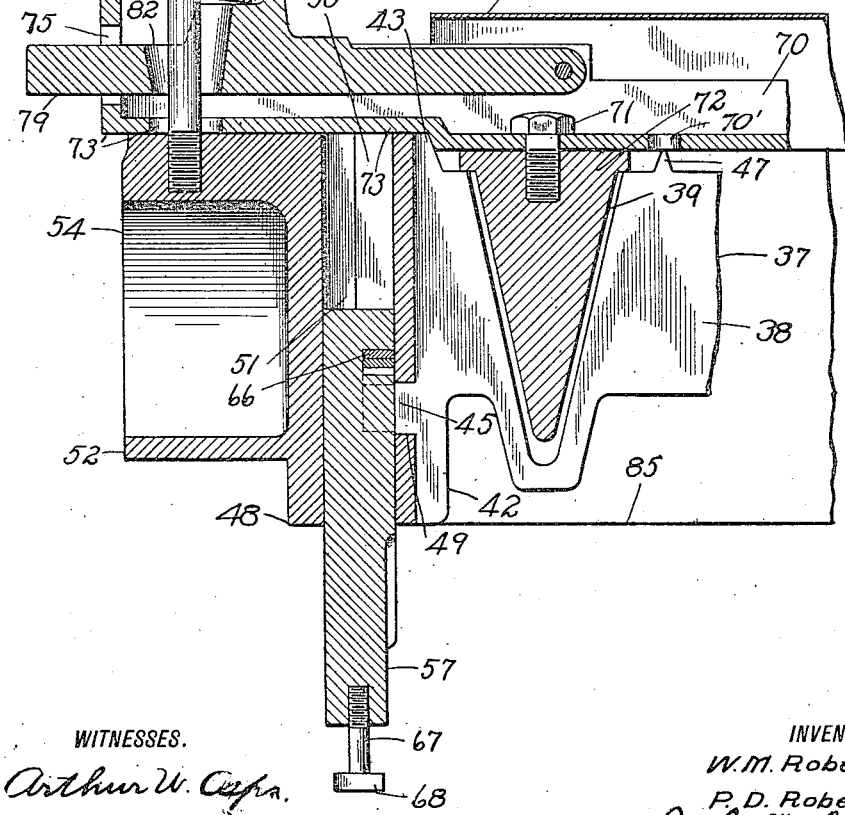
WITNESSES.
INVENTOR
W. M. Roberts.
P. D. Roberts.
BY
ATTORNEY W. M. AND P. D. ROBERTS.
APPARATUS FOR MAKING ICE CREAM CONES.
APPLICATION FILED JUNE 24, 1912. RENEWED SEPT. 10, 1919.
1,375,609.
Patented Apr. 19, 1921.
13 SHEETS—SHEET 7.
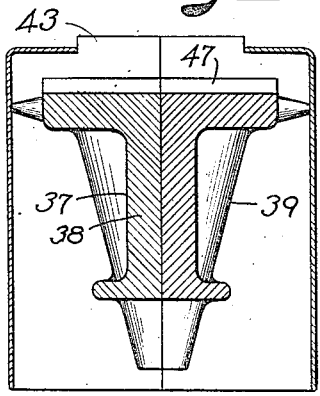
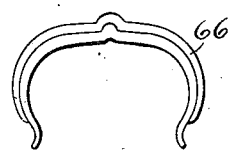
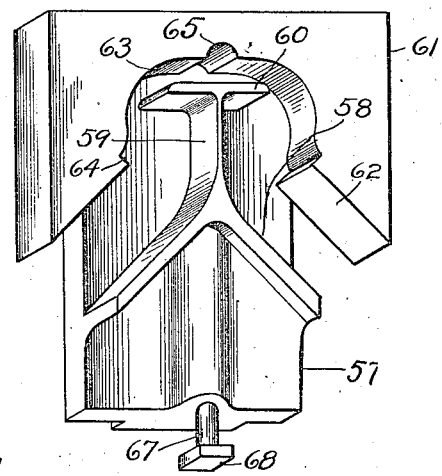
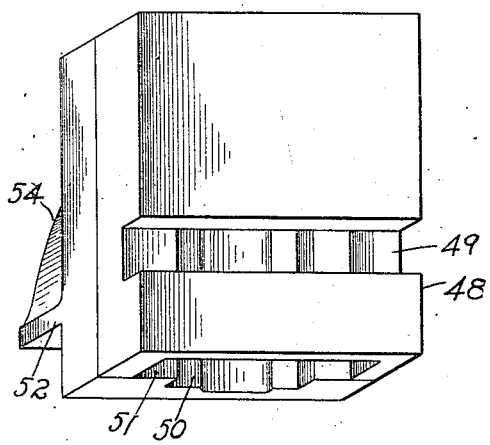
WITNESSES:
Arthur W. Capra.
Lewis L. Miller
INVENTOR
W. M. Roberts.
P. D. Roberts.
BY
ATTORNEY

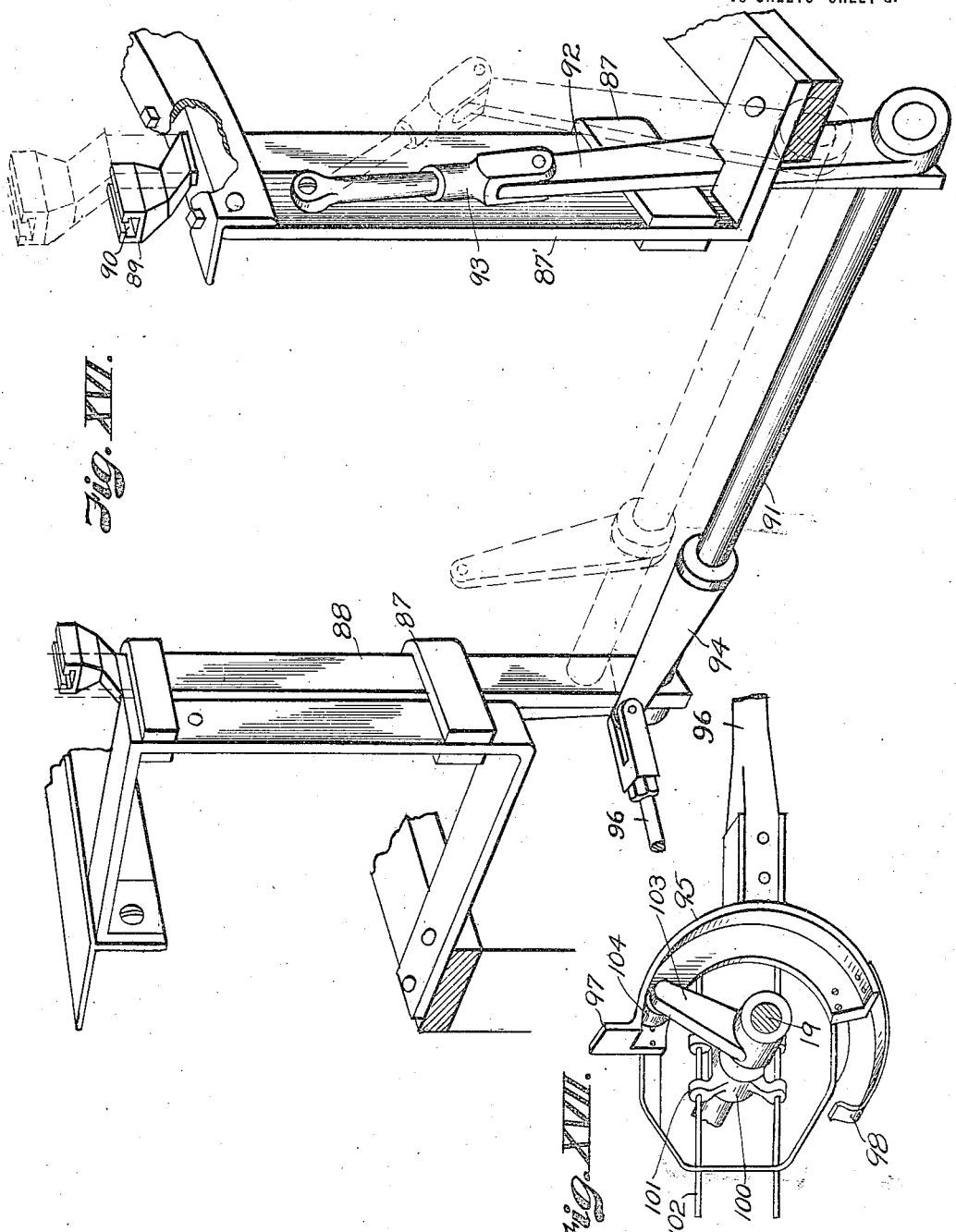

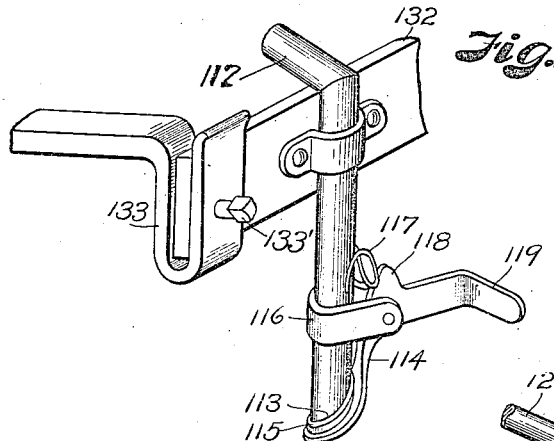
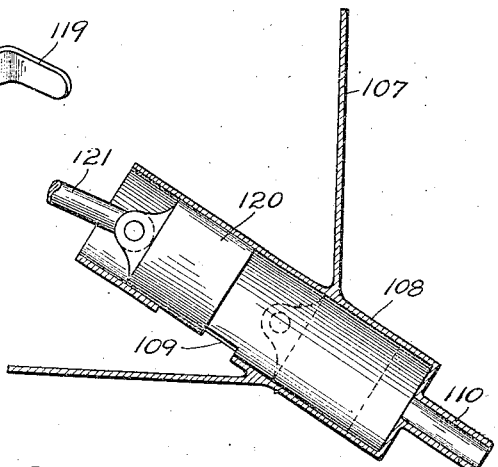
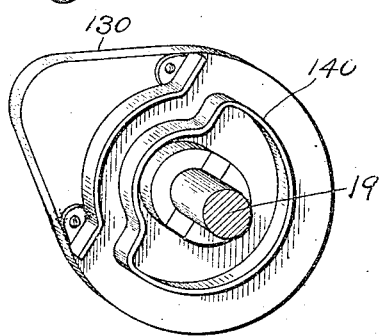
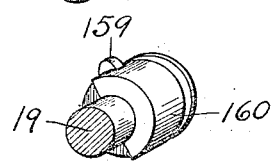
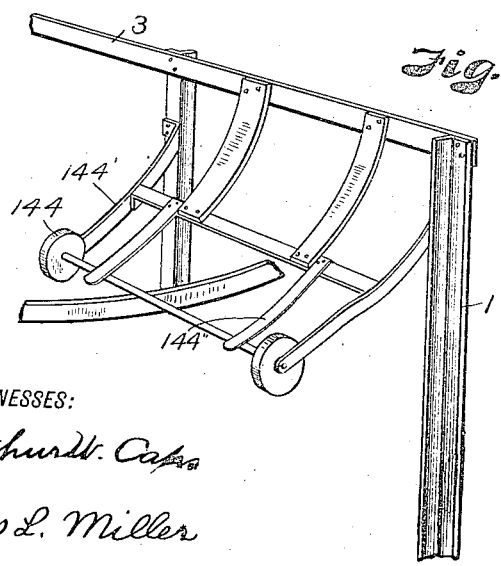

W. M. AND P. D. ROBERTS.
APPARATUS FOR MAKING ICE CREAM CONES.
APPLICATION FILED JUNE 24, 1912. RENEWED SEPT. 10, 1919.
1,375,609.
Patented Apr. 19, 1921.
13 SHEETS—SHEET 10.
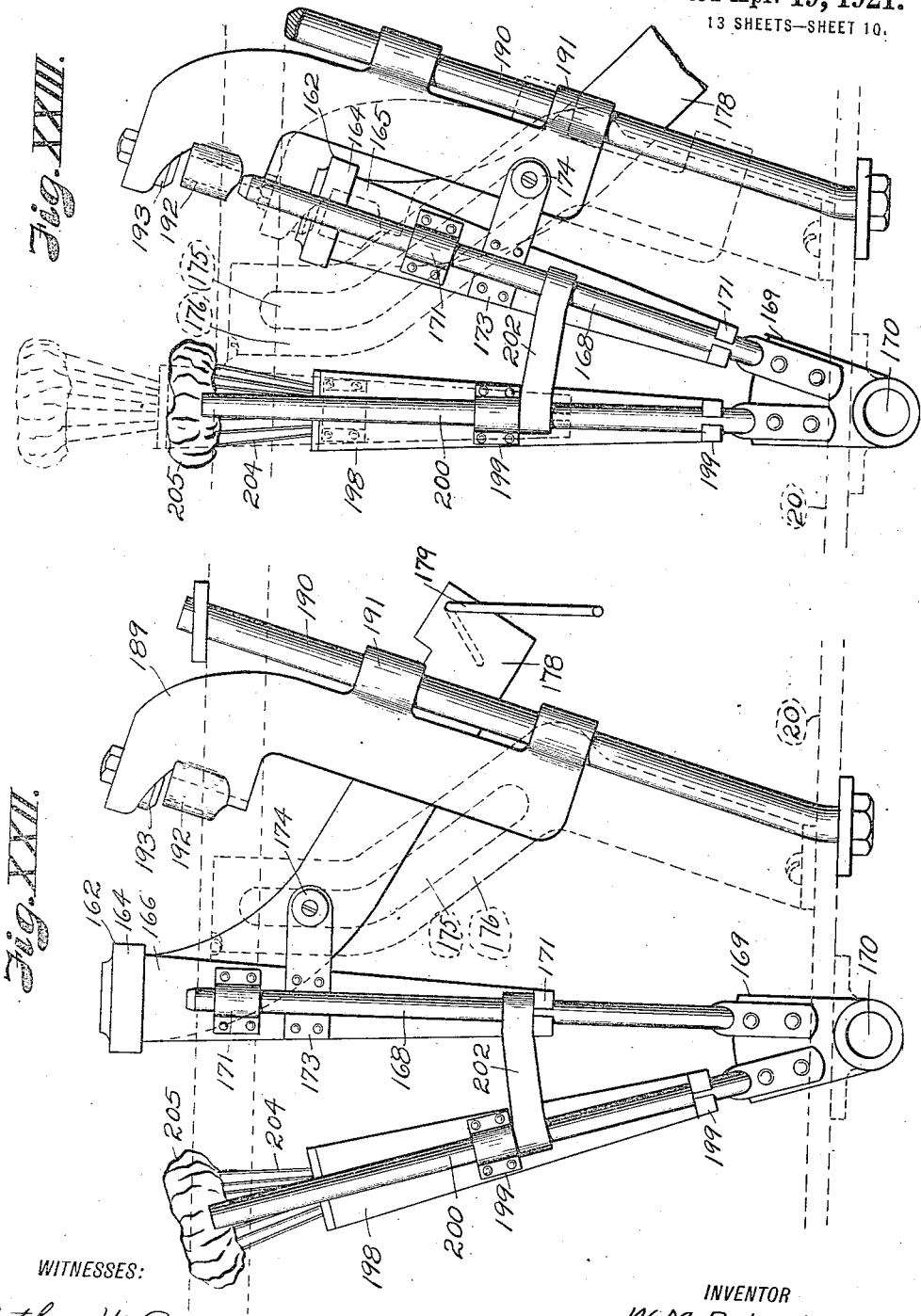
WITNESSES:
Arthur W. Capps.
Lewis L. Miller
INVENTOR
W. M. Roberts.
P. D. Roberts.
BY
ATTORNEY W. M. AND P. D. ROBERTS.
APPARATUS FOR MAKING ICE CREAM CONES.
APPLICATION FILED JUNE 24, 1912. RENEWED SEPT. 10, 1919.
1,375,609.
Patented Apr. 19, 1921.
13 SHEETS—SHEET 11.
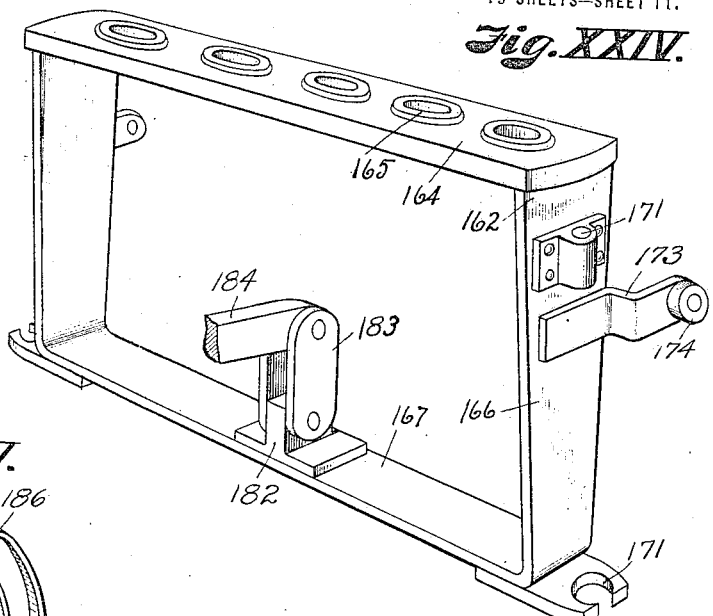
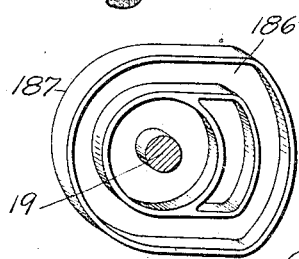
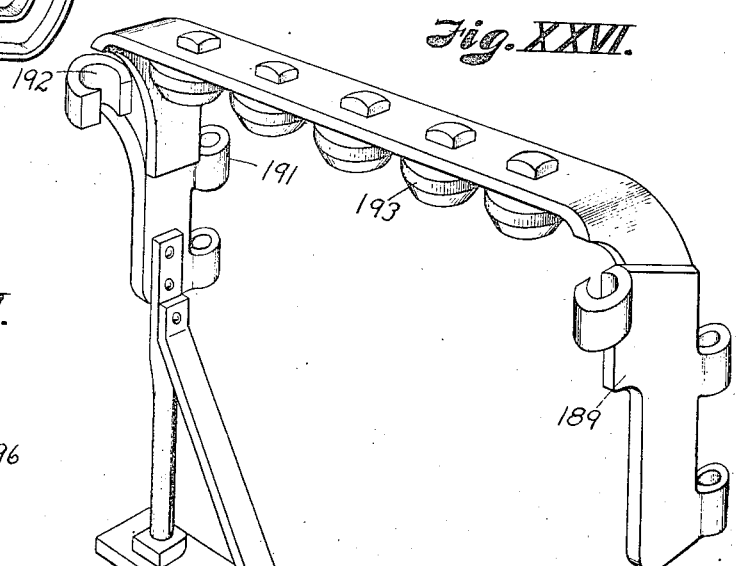
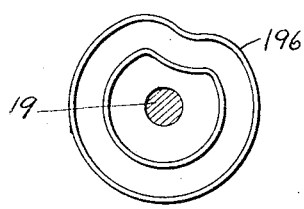
WITNESSES:
Arthur W. Caps
Lewis L. Miller
INVENTOR
W. M. Roberts.
P. D. Roberts.
BY
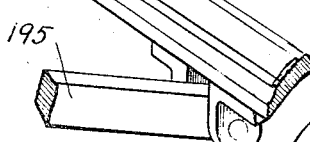
ATTORNEY

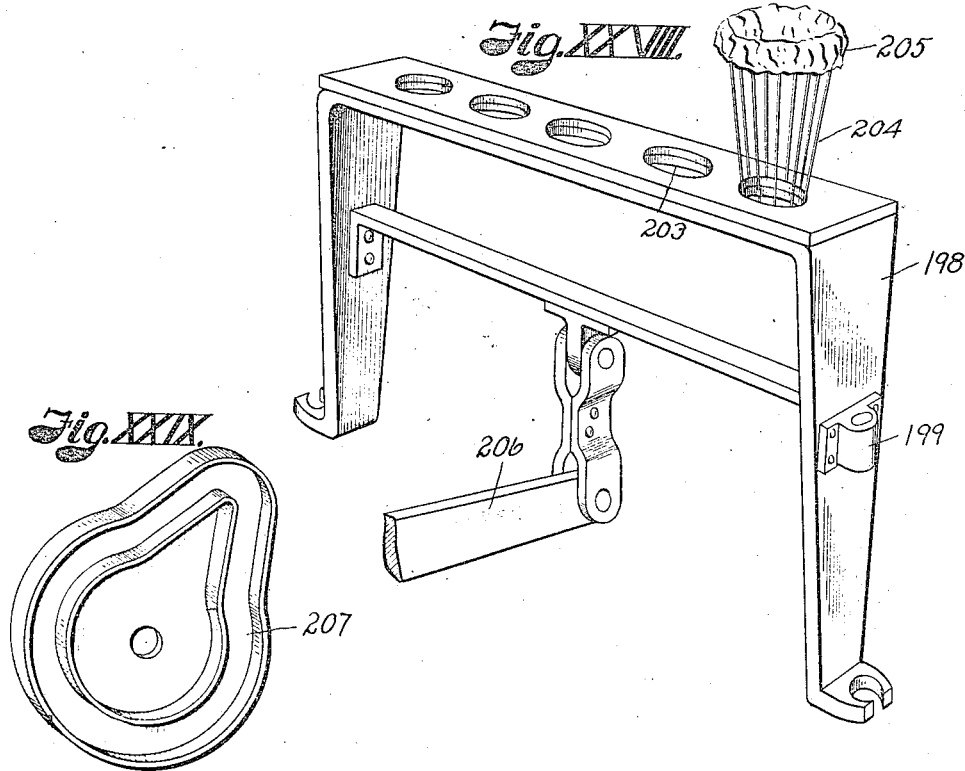
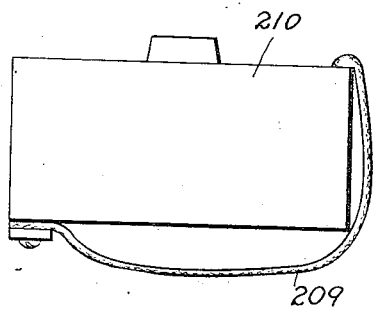

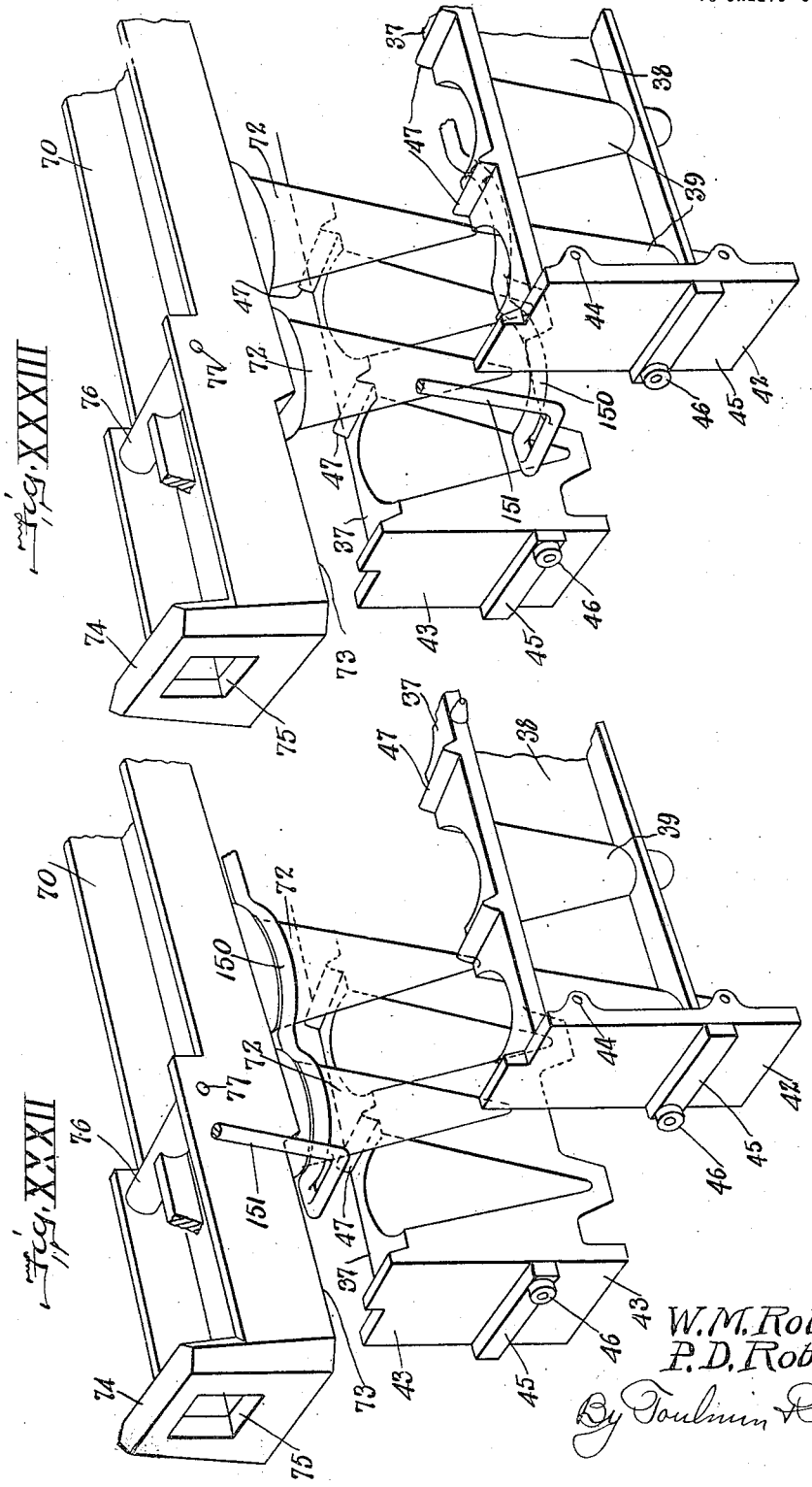

UNITED STATES PATENT OFFICE.

WEBSTER M. ROBERTS AND PARK D. ROBERTS, OF ST. JOSEPH, MISSOURI.

APPARATUS FOR MAKING ICE-CREAM CONES.

1,375,609.                Specification of Letters Patent.     Patented Apr. 19, 1921.

Application filed June 24, 1912, Serial No. 705,584. Renewed September 10, 1919. Serial No. 322,980.

*To all whom it may concern:*

Be it known that we, WEBSTER M. ROBERTS and PARK D. ROBERTS, citizens of the United States, residing at St. Joseph, in the county of Buchanan and State of Missouri, have invented certain new and useful Improvements in Apparatus for Making Ice-Cream Cones; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an apparatus for making ice cream cones and the principal object of the invention is to provide an apparatus for making ice cream cones or similar pastries, comprising separable molds and a suitable core coöperating therewith, means for supplying the molds with batter, a suitable baking oven, and operating mechanism whereby the mold units are moved successively through the oven to effect the baking of the pastry products therein, the apparatus being suitably timed to cause each mold to be in transit through the oven the length of time required for the baking operation.

It is a further object of our invention to provide means for effective delivery of the baked articles from the molds. To this end the molds, or female members of the mold unit, are made in opposite, separable units, the core, or male member, being in a single unit, and suitable automatic mechanism is provided for detaching or releasing the baked articles, preliminary to a trimming operation, and delivery of the finished product from the machine.

To accomplish more effective releasing of the baked articles from both the cores and mold cavities, there being a tendency of the pastry to stick to the metal surfaces, we provide an arrangement, well known in this art in various forms of construction, consisting in corrugating the walls of the mold cavities, the corrugations consisting preferably of an ornamental or trade mark design, and providing the forming cores with a smooth surface so that the baked articles as delivered from the molds will bear upon its exterior the impress of the corrugations of the female molds and upon its interior the plain surface impress of the core.

In the successive steps of delivering the baked articles from the molds, the cores are first lifted a sufficient distance relative to the molds to release the articles from the cores, the corrugations of the mold cavities acting to retain the articles in fixed relation to the molds; the opposite mold sections being then separated to release the articles from the mold cavities, the cores, which then stand at rest with their ends projecting well into the mold cavities, acting in the latter operation to release any articles which may adhere to one or the other of the mold sections as the same are moved apart.

To insure the complete coöperative functioning of the male and female members of the molds, as above described, in every mold-opening operation to present the baked articles delivered therefrom in proper relation to the cone trimming mechanism, we have provided means for stripping from the cores after the same have been lifted in the molds, any of the baked articles or any broken portions thereof which may adhere thereto, and to remove any articles which may remain suspended between the mold sections after the same have been opened. Thus the delivery of the baked articles in every mold-opening operation is positive and complete, and the difficulty heretofore experienced by imperfect or partial delivery of the product from the molds, thus greatly interfering with the subsequent filling and baking operations, is effectually overcome.

The baked articles delivered from the molds are subjected to a trimming or finishing operation of the upper edge of the cones, which is more or less irregular as the cones come from the molds. The finished cones may then be delivered from the machine in any suitable manner.

In accomplishing these and other objects of the invention, which will be disclosed in the following specification, we have provided the improved details of structure hereinafter described and illustrated in the accompanying drawings, wherein:—

Figure I is a plan view of an apparatus constructed according to our invention.

Fig. II is a side elevation of same.

Fig. III is an enlarged plan view of part of the table frame, the table and ovens being removed to illustrate the operating parts and the table forwarding mechanism.

Fig. IV is a detail perspective of the table forwarding eccentric and latch.

Fig. V is a detail view of the latch.

Fig. VI is an inverted perspective of a portion of the table, showing the latch ribs.

Fig. VII is a perspective view of the table stopping mechanism, showing the utilization of the table ribs and the stop latch.

Fig. VIII is a perspective view of one of the mold ovens.

Fig. IX is a perspective view of the mold and cores without the oven casing and other parts.

Fig. X is an enlarged vertical section of one end of the mold, showing a plunger in place and illustrating the mechanism for automatically locking the mold.

Fig. XI is a vertical cross-section on the line XI—XI, Fig. VIII, the case being removed.

Fig. XII is an inside end view of the mold opening block.

Fig. XIII is an inside end view of the mold opening mechanism.

Fig. XIV is a perspective view of the roller block.

Fig. XV is a detail view of the roller spring.

Fig. XVI is an enlarged perspective of the table mechanism for raising and lowering the roller block.

Fig. XVII is a detail perspective of the cam for actuating the block raising and lowering mechanism.

Fig. XVIII is a detail perspective of one of the batter nozzles.

Fig. XIX is a similar view of a batter pump showing its location in the lower corner of the tank.

Fig. XX is a detail perspective of the cam, whereby the lever that actuates the batter feeding devices is operated.

Fig. XXI is a detail perspective of the clutch on the cam shaft, showing a lug that actuates the devices for removing the baked articles from the molds.

Fig. XXII is a side elevation of the cone receiving slide with its chute or trimming die and swab, the parts being in inoperative position.

Fig. XXIII is a similar view of the same parts in operative position.

Fig. XXIV is a perspective view of the cone receiving slide.

Fig. XXV is a detail perspective of the cam for actuating said slide.

Fig. XXVI is a detail perspective of the trimming die slide.

Fig. XXVII is a detail perspective of the cam for actuating the trimming die slide.

Fig. XXVIII is a detail perspective of the swab.

Fig. XXIX is a similar view of the cam for actuating the swab.

Fig. XXX is an enlarged end view of the wick for greasing the swab.

Fig. XXXI is a detail view of the pressure rollers.

Figs. XXXII and XXXIII, respectively, are detail views showing the relative positions of the cone removing device to the cores and molds at the beginning and end of the stripping and ejecting operation.

Referring more in detail to the parts:—

1 designates a skeleton frame, having a central post 2 and ribs 3 which extend radially from the central post and brace the skeleton frame. The lower portion of the post is enlarged to form a pedestal 4, having an upper bearing surface 5 for supporting the collar 6 of a circular table 7, said table comprising the concentric spaced rings 8—9 which are supported from the central collar 6 by the ribs 6' and on rollers 10 carried by the skeleton frame.

Inasmuch as the baking operation performed with our apparatus is continuous, we provide means for stepping the table, so that the molds carried thereby may receive batter at an initial point and then be carried over the heaters. The stepping mechanism, Figs. IV, V, VI and VII, comprises downwardly facing ribs 12 on the under face of the inner table ring 9 and a forwarding latch 13 which is pivotally mounted between ears 14 on a slide 15 which is carried by brackets 16 on the machine frame.

The lower arm of lever 13 is pivotally connected with a pitman 17 carried by an eccentric 18 on the cam shaft 19 which is journaled on a lower cross-bar 20 of the frame 1, and is adapted for actuation from a suitable motor (not shown) through the medium of a gear wheel 21.

It is apparent that with this forwarder the slide will move forwardly and back for each revolution of the cam shaft and that when moved forwardly the lever will be lifted so that it will engage one of the table ribs and advance the table, whereas on the backward movement the latch will be lowered to pass beneath the ribs.

In order to hold the table firmly in a set position, we provide a latch 23 which is pivotally mounted in a bracket 24 on the machine frame, and has a slot 25 in its upper face adapted for receiving one of the table ribs 12.

On one arm of the latch is a stop 26 which is adapted for engaging a lip 27 on the bracket 24, and connected with the opposite end of the latch is a rod 28 which extends through an aperture in a guide plate 29, and is pivotally connected at its lower end with one arm of a bell crank 30.

The bell crank 30 is pivotally mounted in a bracket 31 on the machine frame and has an arm 32 extending into the path of a lip 33 on the eccentric 18 which operates the table forwarding latch, so that as the eccentric starts to rock the forwarding latch to pick up the table, it will also lower the locking latch to release the table to the forwarding action.

A spring 34 surrounds the rod 28 between the latch and the guide plate 29, so that the locking latch is always yieldingly tensioned upwardly, and the approach to the slot 25 is beveled so that the table ribs will ride on and depress the latch to gain their seats in the slot.

With a forwarding mechanism of this character, the table is moved in a circular path in alternating periods of rest and travel to bring the molds and ovens into proper relation with the feeding, heating and releasing mechanism presently described.

Each of the molds comprises a split carriage 37, each part having a web 38 carrying half of the mold chambers 39, of which there are any suitable number.

At the end of each of the mold halves is a plate 42 having lips 43 at their upper ends, in the center, inwardly facing lugs 44 and outwardly facing horizontal rails 45, the latter provided with rollers 46 near their inner edges.

On the upper surfaces of the top plates 41 are ribs 47 which serve as partitions to prevent material overflowing from any of the chambers from uniting with material from an adjacent chamber, the ribs 47 being preferably located intermediate the chamber and of such height that they will effectually prevent flow of the material along the top plate, without interfering with the operation of the plunger bar, presently described.

Mounted on the mold end plates 42 are blocks 48, having horizontal grooves 49 into which the mold rails 45 are projected, and having vertical grooves 50 within which the rollers 46 are exposed.

The blocks 48 are fixed to supporting heads 52, each of which has an inwardly facing vertical groove 51 adapted to coöperate with the block groove 50, and an outwardly facing horizontal rail 52 resting on the inner and outer rings of the table.

Each rail is provided with apertures 53 by which it is secured to its table ring, and has a cover flange 54, the latter being provided with an upstanding post 55.

Slidably mounted in the groove 51 of each end block 52 is a cam head 57 having an inverted V-shaped track 58 on its inner face, which terminates in an upright rib 59, having a cross-bar 60.

On the inner face of each head 57 is a block 61, which is adapted for travel in the slot 50 on the adjacent end block 48, and has inwardly inclined lower edges 62 spaced from and extending parallel with the V-shaped track 58.

The track members 62 are connected by an arch 63, having grooves 64 directly above the track portion and a socket 65 above the cross-bar 60.

A spring 66 is supported on the cross-bar, with its ends overhanging the track standard and adapted to retreat into the grooves 64 under pressure of the rollers 46 on the ends of the mold.

On the lower end of the head 57 is a shank 67, having a button 68 spaced below the lower end of the cam head and adapted to travel into and through a slotted track which is provided for opening the mold in a manner presently described.

Extending across the top of each mold is a plunger bar 70, to the under face of which are rigidly secured, preferably by screws 71, the mold plunger 72, there being a plunger for each mold cut 39, and the plunger bar being provided with apertures 70' intermediate the plunger and which are located over the ribs 47, of the plate 41, when the parts are in operation, and which serve to provide for circulation of air through the molds.

The bars 70 have upwardly offset ends 73 which extend over the lips 43 of the mold end plates, and outwardly therefrom, to seat on the cover flange 54 of the adjacent supporting rail 52, each offset portion having an aperture 73' through which the cover flange pin 55 is projected, and having an end flange 74 provided with a separate aperture 75.

Pivotally mounted on each end of the core bar, preferably by means of a hub 76, which has end pins 77 journaled in the sides of the bar, is a trip 79, the outer end of the trip projecting loosely through the aperture in the end flange 74 of the core bar and having a raised shelf 80 inside of the flange. The parts are so arranged that when the end of the trip bears against the under surface of the top rail of the flange 74, the shelf will be on a level with the upper surface of said rail.

The shelf 80 has a guard flange 81 at its rear end, and opening through part of the shelf, and through the end of the trip, is a downwardly beveled aperture 82, through which the upstanding pin 55 is projected, A washer 83, having a dished upper face 84, is slidably mounted on the pin 55 and adapted for support in a horizontal position on the shelf 80 and the upper face of the flange 74 when the trip is raised, or in an inclined position on the same parts when the trip is lowered.

It is apparent that when the parts are in the last position, the washer will bind on the upstanding pin and lock the core bar thereto.

In order to confine heat within and around the mold mechanism, and form an oven thereof, we cover the mold and core bars with a sheet iron casting 85—85' the former being secured to the lugs 44 and to the mold end plates, and the latter being secured to the body of the core bar, and adapted to fit snugly over the body casing, the casing 85' being raised slightly above the core bar to form egress openings at the ends of the core bar section.

Referring now to the mechanism for opening and closing the molds, and raising and lowering the cores 87 designates guides which are rigidly fixed on the machine frame, and 88 slides which are slidably mounted within the guides.

On the upper ends of the slides 88 are heads 89, having inverted T-slots 90, adapted for receiving the depending buttons 68 on the vertically sliding cam blocks 57, which are carried on the ends of each mold member.

Extending through, and revolubly mounted in the lower ends of the slides 88, is a shaft 91, and fixed to each end of said shaft is a toggle arm 92, the upper end of which is pivotally connected with a link 93 that is in turn pivotally connected with the bracket 87' which carries the slide guides 87.

Fixed on the shaft 91 is a crank arm 94, which is connected with a rearwardly facing curved track 95, by a rod 96. The track 95 has an upturned lip 97 at its upper end, and a spring hook 98 at its lower end, for purposes presently set forth.

The curved track is located just back of the cam shaft 19, and loose on the shaft is a collar 100, having apertured posts 101, through which guide rods 102 on the track 95 are projected, in order that the track may be held in a straight line during its driven travel.

Also fixed on the cam shaft is a crank arm 103, having a laterally projecting roller 104 adapted for engaging the upturned track lip 97, and for travel on the track 95 when the latter has been moved back by the engagement of the roller and lip sufficiently to allow the roller to enter beneath the lip.

With this mechanism, when the table has been stepped, as heretofore described, the depending heads on the cam slides of one mold set enter the slots of the upturned heads 89. When the mold is in that position, the table stops and the cam shaft acts to revolve the arm 103 and push the curved track backwardly to rock the shaft 91, break the toggle and lift the slides 88.

The lifting of the slides lifts the cam block 57 so that the V-track 58 is moved over the rollers 46 on the mold end plates, spreading the mold members apart as the rollers are spread on the V-track, the cores having been raised in advance of the opening of the molds substantially as shown in Figs. XXXII and XXXIII, the mold itself being held against vertical movement by the engagement of the rail 45 in the slot of the fixed end block 48.

It is apparent that raising of the cores and opening of the mold takes place when the cones are to be discharged, and that the cups must be closed to receive the batter, and during the baking operation, the parts being held together by the engagement of the rollers with the ends of the spring 66 and the upper portion of the cam track, as illustrated in full lines in Fig. XIII.

In order to lift the cores in the mold cups first to release the baked articles and, after the articles are discharged from the molds and the molds are again closed, that batter may be inserted into the cups, we provide the frame with a raised rail 105 which is inclined upwardly with the line of travel of the table and downwardly from an apex. As each successive mold reaches the inclined rail the ends of the core bar trip 79 contact the upper edges of the rails and are lifted thereby, the lift of the trip causing the projecting ends 79 to engage the core bar flanges 74 and level the locking disks 83 so that continued upward travel of the trip along the rail will lift the core bar and the cores secured thereto, the bar carrying the casing section 70 with it to expose the mold cups.

When the molds are again closed and while the cores are still in raised position the molds are brought into position for receiving batter from the automatic mechanism provided for that purpose and which we will now describe.

Mounted on the upper portion of the main frame is a batter tank 107, having cylinders 108 opening from the lower rear corner thereof, and extending inwardly within the tank, the inner portions of the cylinders having open ends and having intake ports 109.

Fitting over nipples 110, on the outer ends of the cylinders, are flexible tubes 111 which extend to and are connected with the nozzles 112.

A separate cylinder and nozzle set is provided for each mold cup, but as each set is identical in construction, but one will be described in detail.

Each of the nozzles has a rearwardly inclined mouth 113 at its lower end which is normally covered by a trip 114, having a rubber, or like, face, 115 bearing against the mouth to prevent the escape of batter therefrom and having a cranked part pivotally mounted on a bracket 116 carried by the nozzle tube.

A spring 117, also carried by the nozzle tube, bears against a lug 118 on the upper portion of the trip to yieldingly brace the rubber sealing pad against the nozzle mouth, the end of the trip being projected beyond the lug to provide a trip section 119.

A piston 120 is slidably mounted in the cylinder 108, and a rod 121 extends from the piston and has threaded connection with a socket 122, which is pivotally connected with a crank arm 123 on a rod 124 which is journaled at the upper rear end of the tank.

The rod 124 has a crank member 125 connected with a lever 126 adjacent the cam shaft by a link 127, said lever having a laterally projecting roller 128 projected into a cam path 129 on a cam 130 rigidly mounted on the shaft 19, so that the pump piston is actuated once during each revolution of the cam shaft.

The bar 132 which carries the pump nozzle is preferably mounted in yokes 133 which are in turn pivotally mounted on a shaft 134 journaled in arms 135 on the machine frame, and provided with a crank member 136, having a rod 137 whereby the crank member is connected with a lever 138 pivoted on the frame, and provided with a roller 139 adapted for operative engagement with a cam track 140 on the inner face of the cam 130.

The pump and nozzle parts are so arranged that when the nozzles are held in elevated position the pump will be making its back stroke, and when the nozzle is lowered into a mold cup, and opened by the engagement of the trip 119 with the top of the mold, the pump piston will move forwardly and force batter which has entered the cylinder port 109 through the tube and nozzle into the mold cup.

By having a nozzle for each mold cup, and a separate pump cylinder for each nozzle, the mold cups may be fed independently, but simultaneously, and by having all of the nozzles fixed to the supporting bar 132 they may be raised and lowered in unison.

By removably mounting the bar 132 in the brackets 133 all of the nozzles may be removed together, by loosening the set screws 133' which hold the bar in the brackets, and removing the bar with the nozzles attached thereto.

It is apparent that the lowering and raising of the nozzles may be accomplished quickly, so that the mold cups may be fed without interrupting the travel of the mold, and while the cores are at the upward limit of their travel.

Inasmuch as the molds are hot when the batter is fed thereto, there is a tendency to raise the batter as soon as it comes in contact with the mold, should the cores be forced to their fullest extent into the mold cups before the batter has raised completely. The raising of the batter in the thin space between the core and mold cup would tend to form holes in the baked cone. To obviate such imperfect form, we lower the cores gradually into the cups until they have reached a point near their lowest position, and carry the parts in such relation until the raising process has been completed, the cores being then forced to their full seat in the cup before the oven mold has been brought to the burners.

This action of the cores is accomplished by forming an incline 142, at the rear end of the incline 105 and continuing said incline 142 for some distance as a settling rail 143, which is preferably adjusted at 143' and over the end of which the trip is lowered to allow the cores to descend to their full extent into the mold cups. It is apparent that as the cores descend the trip 78 will drop over the pins 55 so that the shelves 80 assume positions lower than the upper surface of the bar flanges 74, and the locking disks 83 will jam on the pins to lock the core bars in place.

In order to positively seat the cores, we provide pressure rollers 144, which are revolubly mounted on a frame 144', carried by the main frame back of the batter tank, and are yieldingly depressed by springs 144'', so that when the core bar reaches the rollers the latter force same downwardly and positively seat the cores.

Any upward tendency of the molds will, with the parts in this position, lift the outer edges of the locking disk to bind same more firmly against the pins 55 and hold the core bar down, and the cores within the cups, such locking action continuing until the mold has completed a revolution with the table, and again reached the inclined rail which raises the core, after first having rocked the trip to level the locking disk. With the mold supplied with batter, as described, it is then carried over a number of burners 145, which are supported below the path of the table, and fed from a supply pipe 146, heat from the burners rising around the mold and being confined by the casing, so that the heat is made to travel over the sides and top of the mold base and core bar to heat all of the parts, finally escaping through the ends of the core casing section. In order to further secure the benefit from the burners, we provide a hood 147, which covers about one-half of the table path and through which the molds are carried to keep same hot after passing over the burners and complete the baking operation.

As the mold ovens complete their revolution the cones have become baked and are ready to be removed from the molds. In order to remove the baked articles from the molds they are first separated from the forming cores as the core bars are elevated on the inclined tracks 105, the cores thus being raised in the mold cavities and released from the baked articles therein. As the mold units are further advanced they come to a position of rest above the mold opening mechanism with the head 68 of the mold cam slides 57 entered in the slot 90 of the head 89. Thereupon, the mold opening mechanism is actuated from the cam shaft 19 through the connections described and the molds are opened, the opposite sections being moved laterally relative to each other, thus releasing the baked articles from the mold cavities and permitting the same to fall from the open mold sections to the cone trimming devices underneath. However, the baked pastry has a tendency to adhere to the molds, with the result that some of the articles may be carried with one or the other of the mold sections. It also happens at times that baked articles or portions thereof adhere to the forming cores when the same are lifted from the molds. Suitable mechanism is, therefore, provided to make full delivery of the product in each instance of opening the molds positive so that both the cores and mold cavities are entirely freed of the pasty articles.

To this end a core stripper and cone removing device 150 is provided, being disposed above the mold units when the latter are in the position in which the product is removed therefrom, as best shown in Figs. I, II, XXXII and XXXIII of the drawings. The cone removing device consists of a horizontally disposed frame 150 having a plurality of curved portions corresponding in number to the number of cores and molds in each series of mold units and adapted to fit the upper body portions of the cores to strip therefrom any portions of the baked articles adhering thereto and to be projected between the open mold sections to remove therefrom any of the articles which may be adhering to one side or the other of the mold cavities.

Operation of the cone removing mechanism is accomplished from the cam shaft 19 by means of arms 152 from which the member 150 is suspended by links 151, the arms 152 being pivoted on a shaft 153, to one end of which is secured an arm 155 connected by a rod 157 to one end of a pivoted lever 156, the opposite end 158 of the lever 156 being in the path of a raised portion 159 of a cam 160 on the cam shaft 19. Thus, the mechanism for removing the product from the molds will be actuated once upon each rotation of the cam shaft, therefore upon each step of advancement of the mold units, the mechanism being so timed that withdrawal of the forming cores, separation of the mold sections and introduction between the mold sections of the cone removing device will be in proper sequence.

As the mold cup opens it is located over a receiver 162, comprising a cross-bar 164, having an aperture 165, of the same diameter as the large end of the cone, and into which the cone is adapted to drop when released from the mold.

The bar 164 is mounted on the upright arms 166, of a base 167, which is slidably mounted on a rod 168 which rises from a hub plate 169, that is revolubly mounted on a shaft 170 journaled in the main frame, the frame body and standards having guide members 171 adapted to slide on the end rods 168.

The slide is held in its upright position by arms 173, having laterally turned rollers 174 projected into the slots 175 of the guide plates 176, which are rigidly mounted on the frame, said slots being vertical at their upper ends and downwardly and rearwardly inclined at their lower ends, in order to vary the elevation of the slide when the latter is revolved, as will presently be described.

Each of the receiving apertures 165 in said slide opens into a chute 178, through which cones passing through the apertures are delivered to a conveyer in order to remove the cones from the machine and obviate breaking same during such delivery.

In order to break the fall from the chute to the conveyer, we provide a stop member 179, comprising a wire rod, having an end turned into the chute, and a body member extending laterally, so that when the chute tips forwardly with the receiving slide, said body will strike a brace 181, or the like, on the main frame, and rock the stop out of the path of cones within the chute.

The slide is rocked by means of a bracket 182, having a link 183 connecting same with a lever 184, pivotally mounted on the frame and having a roller 185 projected into a cam path 186, on a cam 187, fixed to the cam shaft 19, so that as the shaft revolves the slide is moved backwardly and lowered through its connection with the guide 176, to bring the upper end of the slide beneath a trimming die which, when lowered, cuts the fin from the top of the cone and forces the cone through the slide aperture into the delivery chute.

The die member just mentioned comprises a slide frame 189, which is mounted on an inclined shaft 190, fixed to the frame by means of collars 191, and has guide sleeves 192 for fitting over the receiving slide rods 168 when the latter have moved beneath the last named slide.

The trimmer carries a die member 193 for each receiving aperture of the receiving member, which is adapted to lower over the aperture and cut the fins from the cones and start the cones into the chute.

The trimmer slide is actuated from a lever 195 which, in turn, is operated from a cam 196 on the shaft 19, the cams being so arranged that the trimmer will move downwardly after the receiving slide has been moved into position below the trimmer dies.

In order to grease the plungers so that the cone batter will not stick thereto, we provide a swab which is adapted for movement over the plungers, while the latter are raised and the mold is opened, this device comprising a slide frame 198, (Figs. XXII and XXVIII) having guides 199 adapted for travel over a rod 200 carried by the receiving slide hub and plate 169, and connected with the receiving slide rod by a brace 202, the swab slide comprising an aperture 203 for each plunger, and fixed in the apertures are upstanding wires 204 carrying a mat 205 of wool, or the like, adapted for projection over its relative core when the slide is lifted.

The slide is operated from a lever 206 which, in turn, is operated from a cam 207 fixed on the cam shaft 19 and arranged so that when a receiving slide is moved beneath the trimmer, the swab slide will be lifted to move the swabs over the core.

The swabs are supplied by a wick 209, which is carried by a tank 210, arranged above the rear position of the swab, so that the latter will bear thereagainst, except when moved forwardly to perform its funtion, the wick preferably having one edge located within the tank and its other edge fixed to the bottom of the tank, so that grease, or the like, is taken up by the wick and carried to a position for transfer to the swab.

Briefly describing the operation of the machine, presuming the parts to be assembled as described, and each mold and other unit to comprise duplicate parts for carrying and treating a number of cones simultaneously, and starting with the mold closed, and the cores elevated, the mold is carried beneath the feeding nozzles so that when the latter are rocked, their ends will enter the top of the mold cups and deliver batter thereto.

The nozzles are withdrawn immediately after the batter has been delivered and the cores are then gradually lowered into the cups, giving the batter time to rise before the annular space is reduced to its final width.

After the batter has had time to rise, the cores are completely lowered and the core bar locked by the disk 83 to hold the mold parts firmly together during the baking operation.

Further revolution of the table then carries the mold over the burners so that heat rises within the casing and in passing around the mold escapes through the end of the core bar casing, the mold meanwhile having entered the hood through which it travels while the baking action is continued.

As the mold again approaches the initial position, the mold is opened, the plunger bar is lifted, and the cones stripped from the cores and forced downwardly between the separated molds into the apertures of the receiving slide through which they are delivered into the chute, if no fins have formed on the upper edges.

The receiving slide is then moved rearwardly and beneath the trimmer, and the trimmer dies lowered over the receiving apertures to cut the fins from any of the cones which have been caught in the slide apertures and force said cones down through the apertures into the chute.

When the receiving slide is moved backwardly the swab is carried therewith to a point below the cores and raised through the mold cups to contact the cores and apply grease thereto.

It is apparent that a suitable conveyer may be provided for carrying off the cones delivered thereto from the delivery chute.

It is also apparent that the table may be provided with any suitable number of molds and that each mold unit may consist of a number of individual cups and duplicated parts as the table travels by steps and the various operations may be performed successively on different molds, as they reach the proper positions.

While we have described our apparatus as adapted for making ice cream cones, its adaptability for use in making casseroles, or other pastry containers, is obvious.

Having thus described our invention, what we claim as new therein, and desire to secure by Letters-Patent, is:—

1. A cone making machine comprising sectional molds adapted for travel in a fixed path, means for supplying material to the mold cups, plungers adapted for automatic projection into the cups, means for opening the molds and separate means for removing the plungers, and means for stripping finished cones from the plungers.

2. In a cone making machine, a traveling support, a split mold carried by the support, a vertically grooved head on said support, a slide adapted for travel in said head, converging tracks on said slide, a block fixed on the head and having a vertical groove facing the head groove and a horizontal groove facing the mold, rails on the mold members projected into the horizontal block groove, rollers on said rails projecting into the vertical block grooves and engaging the track, and means for reciprocating the slide, for the purpose set forth.

3. In a cone making machine, a traveling support, a split mold carried by the support, a vertically grooved head on said support, a slide adapted for travel in said head, converging tracks on said slides, having a stop at their upper end, a block fixed on the head and having a vertical groove facing the head groove and a horizontal groove facing the mold, rails on the mold members projected into the horizontal block groove, rollers on said rails projecting into the vertical block grooves and engaging the track, and means for reciprocating the slide, for the purpose set forth.

4. In a cone making machine, a traveling support, a split mold carried by the support, a vertically grooved head on said support, a slide adapted for travel in said head, converging tracks on said slides, having a stop at their upper end, keeper tracks overhanging the converging tracks, a block fixed on the head and having a vertical groove facing the head groove and a horizontal groove facing the mold, rails on the mold members projected into the horizontal block groove, rollers on said rails projecting into the vertical block grooves and engaging the track, and means for reciprocating the slide, for the purpose set forth.

5. In a cone making machine, a traveling support, a split mold carried by the support, a vertically grooved head on said support, a slide adapted for travel in said head, converging tracks on said slide, having a stop at their upper end, keeper tracks overhanging the converging tracks, and having a curved central portion overhanging the stop on the converging tracks, a spring supported on said stop and having end members depending into said trackway, a block fixed on the head and having a vertical groove facing the head groove and a horizontal groove facing the mold, rails on the mold members projected into the horizontal block groove, rollers on said rails projecting into the vertical block grooves and engaging the track, and means for reciprocating the slide.

6. In a cone making machine, a traveling support, a split mold carried by the support, a vertically grooved head on said support, a slide adapted for travel in said head, converging tracks on said slides, having a stop at their upper end, keeper tracks overhanging the converging tracks, and having a curved central portion overhanging the stop, and provided with sockets for receiving portions of said springs, and into which said portions are adapted to retreat when engaged by the mold roller, a spring supported on the stop and having end members depending into said trackway, a block fixed on the head and having a vertical groove facing the head groove and a horizontal groove facing the mold, rails on the mold members projected into the horizontal block groove, rollers on said rails projecting into the vertical block grooves and engaging the track, means for reciprocating the slide.

7. In a cone making machine, a traveling support, a split mold mounted on the support, heads fixed on the support, slides carried by the heads and engaging the mold members, depending heads on the slides, blocks adapted for receiving the slide heads when the mold members are moved thereover, and means for reciprocating said blocks, to open and close the mold by reciprocating said slide.

8. In a cone making machine, a traveling support, a split mold mounted on the support, heads fixed on the support, slides carried by the heads and engaging the mold members, depending heads on the slides, slotted blocks adapted for receiving the slide heads when the mold members are moved thereover, and means for reciprocating said blocks, to open and close the mold by reciprocating said slide.

9. In a cone making machine, a traveling support, a split mold mounted on the support, heads fixed on the support, slides carried by the heads and engaging the mold members, depending heads on the slides, blocks adapted for receiving the slide heads when the mold members are moved thereover, and toggle mechanism for reciprocating said blocks, to open and close the mold by reciprocating said slide.

10. In a cone making machine, a traveling support, a split mold mounted on the support, heads fixed on the support, slides carried by the heads and engaging the mold members, depending heads on the slides, adapted for vertical travel in the frame, blocks on the slides having T slots for receiving the mold slides, a shaft carried by said frame slides, toggle links pivotally connected with the frame and with said shaft, a lever on said shaft, and a cam for rocking the lever, for the purpose set forth.

11. In a cone making machine, a traveling support, a split mold mounted on the support, heads fixed on the support, slides carried by the heads in engagement with the mold members, shanks on said slides provided with buttons, slides adapted for vertical travel in the frame, blocks on the frame slides having T slots for receiving the shank buttons, a shaft carried by said frame slides, toggle links pivotally connected with the frame and with said shaft, a lever on said shaft, a rod connected with said lever, a curved track on said rod having a rigid lip at one end and a spring lip at the other end, and a revoluble arm adapted for engaging said track and said lips.

12. In a cone making machine, a traveling support, a split mold mounted on the support, heads fixed on the support, slides carried by the heads and engaging the mold members, depending buttons on the slides, slides adapted for vertical travel in the frame, blocks on the frame slides having T slots for receiving the depending buttons, a shaft carried by said frame slides, toggle links pivotally connected with the frame and with said shaft, a lever on said shaft, a rod connected with said lever, a curved track on said rod having a rigid lip at one end and a spring lip at the other end, a shaft, a collar on said shaft, having guide arms, guide rods fixed to the track and projected through said arms, and an arm fixed on the shaft and having a roller adapted for engaging the curved track.

13. In a cone making machine, a mold comprising a body member, having an upstanding post and an upturned apertured flange, a plunger bar adapted for vertical movement above the mold body, a trip pivotally connected with the plunger bar and extended through the apertured flange, said trip having an aperture through which the upstanding post is projected and having a shelf adjacent the post, a latch member slidably mounted on the post and adapted for support on the upstanding flange and on said shelf, and a track over which the projecting end of said trip is adapted to travel.

14. In a cone making machine, a mold comprising a body member, having an upstanding post and an inturned apertured flange, a plunger bar adapted for vertical movement above the mold body, a trip pivotally connected with the plunger bar and extended through the apertured flange, said trip having an aperture through which the upstanding post is projected and having a shelf adjacent the post, a latch member slidably mounted on the post and adapted for support on the upstanding flange and on said shelf, and a track over which the projecting end of said trip is adapted to travel, said shelf and upturned flange being arranged to level the latch member when the trip is elevated and allow the member to tip and bind against the post when the trip is lowered.

15. The combination with a suitable mold, of a nozzle adapted for movement toward and from the mold, a cap yieldingly closing the mouth of the nozzle and adapted for engaging the mold to open the nozzle when the latter is moved toward the mold, and means for delivering batter to said nozzles.

16. The combination with a sectional mold, of means for opening the mold, a plunger adapted for automatic projection into the mold when the latter is closed and withdrawal therefrom when the mold is opened, and a stripper adapted for automatic movement over the plunger when the latter is withdrawn from the mold.

17. The combination with a mold, of a receiving member having an aperture adapted for receiving a cone from the mold when the latter is opened, and means for automatically opening the mold and swinging the receiving member to a delivery position.

18. The combination with a mold and plunger, of means for opening the mold, a pivotally mounted frame, a swab slidably mounted on the frame, and comprising a circle of spring wires having a mat at their free ends and means for automatically rocking the frame and raising the swab through the mold and into contact with the plunger.

19. In a cone making machine, a supporting frame, a table revolubly mounted on said supporting frame, burners mounted beneath part of the table, a hood carried by said frame and covering a part of said table and said burners, a plurality of molds secured to said table and an individual hood on each of said molds for conserving heat therein, independently of the other molds.

20. In a cone making machine, a burner, a mold comprising a plurality of cups, a hood open at the bottom and top surrounding said cups and adapted to receive heat from said burner, an apertured, channeled member for covering the top opening in said hood, plungers on said channeled member projecting into said cups, a hood on said channeled member, having end openings adapted to receive heat from the apertures in said channeled member, and means for locking said channeled member in position.

21. In a cone making machine, a burner, a mold comprising a plurality of cups, a hood surrounding and spaced from said cups, upwardly extending transverse ribs between said cups, a channeled member adapted to rest on said ribs and having an aperture communicating with the space between said cups and hood, a plurality of plungers carried by said channeled member, adapted for projection into said cups, and an open hood on said channeled member for exhausting heat from said first named hood.

22. In a cone making machine, a burner, a mold comprising a plurality of cups, a hood surrounding and spaced from said cups, upwardly extending transverse ribs between said cups, a channeled member adapted to rest on said ribs, and having apertures overlying said ribs and communicating with the space between said cups and hood on each side of said ribs, a plurality of plungers carried by said channeled member adapted for projection into said cups, and a hood on said channeled member adapted for conducting and exhausting heat received from said apertures at the end of the mold.

23. In a cone making machine, a burner, a mold comprising halved mold members conjointly forming a plurality of cups, an upwardly extending transverse rib between each pair of cups, an upwardly and outwardly inclined rib at each end of the mold, a hood spaced from the sides of said cups and having inturned upper edges, a channeled member having a downset portion projecting between the inturned upper edges of said hood and adapted to rest upon said intermediate ribs and between said end ribs, and having apertures overlying each intermediate rib and adapted to receive heat from said hood, a plurality of plungers carried by said channeled member and adapted for projection into said cups, and a hood on said channeled member having outwardly turned lower edges resting on the inturned edges of said first hood and adapted for receiving heat from said apertures and exhausting the same near the ends of said mold.

24. In a cone making machine, a burner, a mold comprising a plurality of cups, a hood spaced from the sides of the cups and having inturned upper edges, a channeled member adapted for projection between the inturned upper edges of said hood, and having a plurality of apertures communicating with the interior thereof, a plurality of plungers carried by said channeled member and adapted for projection into said cups, and a hood on said channeled member having outturned lower edges resting on the inturned upper edges of said first hood and adapted for conducting the heat received from the first hood to the end of the mold.

25. In a cone making machine, a mold comprising a body member, a plunger bar adapted for vertical movement above the mold body, an inclined track for controlling the gravitational movement of said plunger bar, a latch for locking said bar at any point in its movement, and spring-pressed rollers for engaging said bar at the termination of said track.

26. In a cone making machine, a mold comprising a body member having a plurality of cups for receiving batter, a bar having a plurality of plungers adapted for gravitational movement into said cups to spread the batter, a track for governing the downward movement of said plungers, and a pair of spring-pressed rollers for engaging said bar for ultimately pressing said plungers into functional position.

27. In a cone making machine, a burner, a mold adapted to receive heat from said burner and comprising a plurality of cups, a bar having a plurality of plungers adapted for gravitational movement into said cups, a track for controlling the downward movement of said plungers, latches for locking said plungers against upward movement at any point in their downward travel, and a pair of spring-pressed rollers for ultimately pressing said plungers into functional position.

28. In a cone making machine a mold comprising a body having a plurality of cups for receiving batter, a burner for heating said mold to raise said batter, a bar having a plurality of plungers adapted for projection into and gravitational movement toward said cups, a track for governing the downward movement of said plungers to spread said batter during the raising process, and a pair of spring-pressed rollers for ultimately pressing said plungers into functional position at the completion of the raising process.

29. In a cone making machine, a mold comprising a body member having upstanding parts, a plunger bar having upturned, apertured flanges and adapted for vertical movement above the mold body, a trip pivotally connected with the plunger bar and extended through the apertured flange, said trip having an aperture through which the posts are projected, and having a shelf adjacent the post, a latch member slidably mounted on the post and adapted for support on the upstanding flange and on said shelf, a track for simultaneously releasing said latch and raising said plunger bar, and a pair of spring-pressed rollers at the end of said track for ultimately pressing said plungers into functional position.

30. The combination with a mold and a plunger, of a pivotally mounted frame, a bar slidably mounted on the frame, a swab mounted on said bar, means for actuating the mold and plunger, separate means for rocking the frame at proper intervals, relative to the movement of the mold and plunger, and other means for reciprocating the bar to move said swab into the mold, substantially as set forth.

31. The combination, with a plurality of sectional molds, a corresponding plurality of cores therefor, means to lift the cores in the molds, means to open the molds, and an ejector adapted to move downwardly to eject the cones with the small ends foremost during the ejecting thereof.

32. In a machine for the purpose described, the combination of a rotatable body provided with a series of sectional molds, and a series of forming cores, each mold being adapted to receive one of the forming cores, means for heating the molds, means for successively effecting relative movement between each core and its mold while the sections of the latter are in closed relation to loosen the baked article from the core, means for effecting relative movement between the sections of the mold in which the baked articles have been loosened from the cores to release each article therein from the mold, and an ejecting device to remove the articles small end foremost.

33. In a machine of the character described, the combination of a plurality of forming cores, a plurality of sectional molds, each adapted to receive one of said cores, means for effecting travel of the molds and cores, means for effecting relative movement between the cores and sections of the molds to release the articles in the molds, and a relatively stationarily located ejecting device coöperative with all of the molds to remove the articles.

34. In a machine of the character described, the combination of a plurality of forming cores, a plurality of sectional molds each adapted to receive one of the cores at times, means for supporting the molds and forming cores to travel in closed paths, means for heating the molds and cores, means for successively effecting relative movement between each core and its mold to loosen the pastry from the core, means for opening the mold to cause the pastry to be disengaged from the mold walls, and an ejecting device common to all of the molds and relatively fixed as to location with respect to the travel of the molds and cores, and means for moving said ejecting device to remove the pastry articles.

35. In a machine of the class described, the combination with a series of sectional molds and core units, a conveyer for carrying said units from place to place, a batter reservoir past which said units are conveyed, adapted to supply batter thereto, an extracting device located at a definite station relative to the movement of said units, means for moving the cores relative to the molds, means for opening the molds to release the product therein, and means for operating the extracting devices to remove the product.

36. In a machine of the class described, the combination with a series of sectional molds and core units, a conveyer for carrying said units from place to place, a batter reservoir, past which said units are conveyed, adapted to supply batter thereto, means for heating said units, an extracting device located at a definite station relative to the movement of the mold and core units, means for removing the cores relative to the molds, means for opening the molds, and means for operating the extracting devices to remove the product.

37. In a cone making machine, a supporting frame, a traveling support, a plurality of molds on said support, burners for heating said molds, a hood adapted to cover a part of said traveling support, and an individual means for each of said molds for retaining the heat therein independent of the other molds.

38. In a cone making machine, a plurality of separable molds, means for separating the mold members, and means for forming the interior of the cones and for causing the cones to pass through the molds.

39. In a cone making machine, the combination, with a mold comprising separable members, of means located near the mold and adapted by suitable operating devices to cause the cones to descend through the mold members and means for trimming the cones.

40. In a cone making machine, the combination, with a mold comprising separable members, of means located near the mold and adapted by suitable operating devices to engage the cones to cause them to pass through the mold members small end foremost.

41. A cone making machine comprising sectional grooved molds adapted for travel in a fixed path, means for supplying material to the molds, plungers adapted for automatic projection into the molds, means for opening the molds, and means for stripping the finished cones from the plungers.

42. In a machine of the character described, the combination, with a mold comprised of sections, each section having a partial mold cavity, and devices adapted to hold the mold halves together when they are closed and to open them, of forming cores adapted to enter and withdraw from said mold cavities, cone removing or ejector devices to cause the product to be discharged, and mechanism to so operate the cores and cone removing or ejector devices.

43. In a cone making machine, a traveling support, molds movable thereby, said molds comprising sections automatically separable laterally but kept parallel with each other, and mold cores for coöperating with the sections.

44. In a cone making machine, a traveling support, sectional molds and cores therefor movable by the support, means for holding the sections together and for separating them by moving them parallel with each other to permit the cones to pass therebetween and means for trimming the cones after they pass between the sections.

45. A cone making machine comprising sectional molds, means for separating the molds the same amount throughout their length and means for forming the interior of the cones and positively ejecting them small end foremost.

46. In a cone baking machine, a carrier rotatably mounted about a vertical axis, a plurality of molds supported by said carrier, core supports on said carrier, cores mounted on said supports and movable into and out of said molds in downward and upward directions, respectively, while maintaining their axes in vertical position, means operative to cause movement of said cores, and means for heating said molds and cores.

47. In a machine of the character described, the combination, with a mold comprised of sections, each section having a partial mold cavity, and devices adapted to hold the mold halves together when they are closed and to move them parallel with each other when they are opened, of forming cores adapted to enter and withdraw from said mold cavities, ejectors adapted to cause the product to be discharged, and means to so operate the cores and ejectors.

48. In a machine of the character described, a plurality of sets of separable mold sections having semi-mold cavities, those of one section adapted to register with those of the opposing section, cores therefor, means for sustaining the mold sections to be opened and closed by relative movement of the same bodily laterally while maintaining their opposing faces in planes parallel to the axes of the mold cavities as a whole, and means for introducing and removing the cores from the mold cavities, the baked articles being adapted to pass through between the mold sections when the molds are opened.

49. In a machine of the character described, a plurality of sets of separable mold sections having semi-mold cavities, those of one section adapted to register with those of the opposing section, cores therefor, means for sustaining the mold sections to be opened and closed by relative movement of the same bodily laterally while maintaining their opposing faces in planes parallel to the axes of the mold cavities as a whole, means for introducing and removing the cores from the mold cavities, means for discharging the baked articles, and means for relatively moving the mold sections and the discharging means whereby the baked articles are loosened from the mold sections, said articles being adapted to pass through between the mold sections when the sections are separated.

50. A cone making machine, a traveling support, sectional molds movable thereby, a corresponding plurality of cores therefor, a core bar for supporting the cores, and means for automatically separating the mold sections and also separating said core bar and molds while maintaining the same in parallel relation with each other.

51. In a cone making machine a traveling support, molds movable thereby, said molds comprising sections automatically separable laterally but kept parallel with each other, a corresponding plurality of cores therefor, said cores supported by a core bar, and means for automatically separating said mold sections and core bar while maintaining them parallel with each other.

52. In a cone making machine, the combination, of baking molds formed in separate sections, and means coacting with said sections to open and close them in parallel relation one section with the other, forming cores adapted to be inserted and withdrawn in and from said molds, means for ejecting cones formed thereby through and between said mold sections and means to maintain said forming cores in parallelism with said mold sections, whereby the three elements, each mold section and the forming cores will move to and from each other and be held in operative position in parallel relation to each other.

In testimony whereof we affix our signatures in presence of two witnesses.

WEBSTER M. ROBERTS.
PARK D. ROBERTS.

Witnesses:
MARMADUKE B. MORTON,
JOSEPH N. WALKER.

CERTIFICATE OF CORRECTION.

Patent No. 1,375,609.             Granted April 19, 1921, to

WEBSTER M. ROBERTS and PARK D. ROBERTS.

It is hereby certified that error appears in the printed specification of the aboved numbered patent requiring correction as follows: Page 11, strike out lines 127 and 128, and page 12, strike out lines 1 to 43, comprising claims 47, 48 and 49; page 12, lines 44, 52 and 61, for claim numbers 50, 51 and 52 read 47, 48 and 49; and that the said Letters Patent should be read with these corrections therein that the same may conform to the record of the case in the Patent Office.

Signed and sealed this 1st day of May, A. D. 1928.

<div style="text-align:right">
M. J. Moore.<br>
Acting Commissioner of Patents.
</div>